(12) United States Patent
Spaid

(10) Patent No.: US 7,269,643 B2
(45) Date of Patent: Sep. 11, 2007

(54) WEB SITE VISIT QUALITY MEASUREMENT SYSTEM

(75) Inventor: Brian Ijams Spaid, Knoxville, TN (US)

(73) Assignee: Mediapulse, Inc., Oak Ridge, TN (US)

( * ) Notice: Subject to any disclaimer, the term of this patent is extended or adjusted under 35 U.S.C. 154(b) by 748 days.

(21) Appl. No.: 10/321,343

(22) Filed: Dec. 17, 2002

(65) Prior Publication Data

US 2004/0139192 A1 Jul. 15, 2004

(51) Int. Cl.
*G06F 15/173* (2006.01)
(52) U.S. Cl. .................... 709/223; 709/224; 709/227
(58) Field of Classification Search ............. 709/223, 709/224, 227
See application file for complete search history.

(56) References Cited

U.S. PATENT DOCUMENTS

| | | | | |
|---|---|---|---|---|
| 5,761,647 | A | | 6/1998 | Boushy ......................... 705/10 |
| 5,796,952 | A | | 8/1998 | Davis et al. ............. 395/200.54 |
| 5,960,409 | A | | 9/1999 | Wexler ......................... 705/14 |
| 6,035,332 | A | * | 3/2000 | Ingrassia et al. ............ 709/224 |
| 6,038,598 | A | | 3/2000 | Danneels ..................... 709/219 |
| 6,044,376 | A | | 3/2000 | Kurtzman, II ............... 707/102 |
| 6,052,730 | A | | 4/2000 | Felciano et al. ............ 709/225 |
| 6,070,145 | A | | 5/2000 | Pinsley et al. ................ 705/10 |
| 6,151,585 | A | | 11/2000 | Altschuler et al. ............ 705/10 |
| 6,195,679 | B1 | | 2/2001 | Bauersfeld et al. ......... 709/203 |
| 6,202,056 | B1 | | 3/2001 | Nuttall ........................ 705/52 |
| 6,243,750 | B1 | * | 6/2001 | Verma ........................ 709/224 |
| 6,338,066 | B1 | | 1/2002 | Martin et al. ................. 707/10 |
| 6,341,310 | B1 | | 1/2002 | Leshem et al. ............. 709/223 |
| 6,360,235 | B1 | | 3/2002 | Tilt et al. ................ 707/501.1 |
| 6,366,298 | B1 | | 4/2002 | Haitsuka et al. ............ 345/736 |
| 6,397,256 | B1 | | 5/2002 | Chan et al. ................. 709/229 |
| 6,397,264 | B1 | | 5/2002 | Stasnick et al. ............ 709/328 |
| 6,957,390 | B2 | * | 10/2005 | Tamir et al. ................ 715/744 |
| 2002/0198882 | A1 | * | 12/2002 | Linden et al. ................ 707/10 |
| 2003/0014399 | A1 | * | 1/2003 | Hansen et al. ................. 707/3 |
| 2004/0025174 | A1 | * | 2/2004 | Cerrato .......................... 725/9 |

OTHER PUBLICATIONS

*Measuring Web Site Traffic: Panel vs. Audit*, I/Pro, A TopicalNet Company, pp. 1-11, <http://www.ipro.com>.
*Measuring Web Site Traffic: Computerworld*, p. 42, (Jun. 17, 2002).
K. Manley, *Monitoring Web Application Performance & ISAPI*, Dr. Dobb's Journal, pp. 65-68, (Jul. 2002).

* cited by examiner

*Primary Examiner*—Zarni Maung
*Assistant Examiner*—Nghi Tran
(74) *Attorney, Agent, or Firm*—Akerman Senterfitt

(57) ABSTRACT

A Web site quality measurement system and method. The Web site quality measurement method can include logging visitor data and session data for a Web site viewing session established between a Web site visitor and a Web site having one or more Web site pages. The logged visitor data and session data can be individually evaluated based upon pre-established ranking criteria. Subsequently, a composite score can be computed for the Web site viewing session based upon the individually evaluated data.

7 Claims, 3 Drawing Sheets

WEB SITE VISIT QUALITY MEASUREMENT SYSTEM

BACKGROUND OF THE INVENTION

1. Statement of the Technical Field

The present invention relates to Web site traffic measurement.

2. Description of the Related Art

Generalized media has always included an advertising component aimed at defraying the cost of the media content itself. For instance, in the context of print media, magazine and newspaper advertisements provide a subsidy which in many cases counter-balances the cost of producing the textual content. By comparison, television media can base almost the entirety of its revenue upon the pre-sale of commercial advertisement slots. So much has the commercial advertising component become an element of television media, the content of commercial advertisements themselves often serve as the subject matter of television programs.

To gauge the effectiveness of a commercial advertisement in print media, oftentimes advertisers survey their customers to identify which customers first learned of a particular company or product through print advertisements. Similarly, in television media, advertisers can survey their respective customers to identify which customers first learned of a particular company or product through television commercial advertisements. Based upon the success rate of generating leads through commercial advertisements, media organizations such as television networks and print publishers can determine a fair pricing scheme for particularly timed or placed commercial advertisements.

Still, notwithstanding the actual number of leads or sales generated by a specific advertising campaign, the majority component of a pricing scheme can be directly related to the number of viewers of a television program, or the number of subscribers to a magazine or newspaper. To determine the size of an advertiser's audience in a specific magazine or newspaper, an advertiser need only consult the "circulation" of a specific magazine. More precisely, one can quantify the number of end-viewers of magazine or newspaper by comparing the number of print copies produced to the number of print copies returned to the publisher. The net result not only can include subscribers to the print copies, but also newsstand and bookstore sales, and the like.

Whereas the determination of an audience size in the context of print media can be a straightforward analysis, the analysis can be less precise in the context of television media. That is to say, television networks to date cannot identify every television tuned to a particular program at a particular time. Moreover, television networks cannot determine the number of people viewing a program through a television at a given time. Rather, the quantification of a viewing audience in television media largely is based upon limited survey samples and classic statistical models. As a result, an entire cottage industry of television program ranking has come to formation, mostly notably known through the pre-eminent ranking authority, the Nielson ratings.

Given the advent of the Internet, a new medium of commercial advertising has emerged having the potential to reach many millions more viewers than would otherwise be possible within the scope of print and television media. Mostly through the World Wide Web, commercial advertisements can be distributed to millions of on-line individuals asynchronously over a geographically dispersed area which literally encompasses the entire globe. Examples of such commercial advertisements include entire Web sites, Web site banner advertisements, strategically placed advertisements within a Web site, pop-up advertisements, etc. Still, pricing the distribution of commercial advertisements within the World Wide Web can be inexact when compared to pricing in the print media context. Moreover, the effectiveness of a marketing campaign centrally focused about a Web site can be deceptively difficult to quantify.

To facilitate the quantification of the effectiveness of a Web site, many have developed analysis tools designed to measure the number of persons ("surfers") who have viewed portions of or an entire Web site. Most typically, conventional Web site monitoring tools perform a traffic analysis process in two parts: one dynamically and one statically. In particular, conventional Web site monitoring tools generate a log of Web site interactions dynamically as surfers view individual Web pages in a Web site. Web site logs typically include both success or failure data associated with the outcome of a request to access a Web page, and Internet protocol (IP) addressing data associated with the surfer and the requested resource with the Web page, including the Web page itself. Subsequently, a data reduction process can statically parse the log to identify trends, such as number of "hits", number of pages downloaded within a particular period of time, etc.

Despite the sophistication of analytical techniques which have been applied to Web server logs, conventional analytical techniques have proven deficient in several regards. First, log file analysis can be ineffective when undertaken by the layperson. Moreover, log file analysis heretofore has not been automated so as to produce a subjective analysis of log file data without requiring human intervention. Finally, log file analysis cannot alone be used to evaluate the effectiveness of a Web site. Rather, conventional analytical techniques have proven effective only to the extent that these conventional techniques relate to a top-down approach based upon the performance of analyzed Web sites in the aggregate. Conventional techniques wholly ignore analytical metrics which might relate to the viewing of a Web site by an individual surfer. Thus, conventional techniques are misconfigured in this regard and are not able to quantify the "quality" of a Web site or visits to the Web site.

SUMMARY OF THE INVENTION

The present invention is a Web site quality measurement system and method which overcomes the short-fallings of conventional Web site traffic measurement systems and provides a novel and non-obvious system, method and machine readable storage for measuring the quality of individual Web site visits for individual visitors. In one aspect of the invention, a Web site quality measurement method can be provided. The method can include logging visitor data and session data for a Web site viewing session established between a Web site visitor and a Web site having one or more Web site pages. The logged visitor data and session data can be individually ranked based upon pre-established ranking criteria. Subsequently, a composite score can be computed for the Web site viewing session based upon the individually ranked data.

Notably, the computing step can include weighting the individually ranked logged data based upon pre-established weights associated with the visitor data and session data. In consequence, a weighted composite score can be computed for the Web site viewing session based upon the weighted data. In this way, ranking criteria which has been deemed relatively more important can be emphasized during the computation process. Additionally, past computations for the same visitor can be considered as the computed weighted composite score can be added to a database of historical scores for the Web site visitor.

In this regard, during the computational step, the historical scores can be averaged for the Web site visitor. Subsequently, the averaged historical scores can be weighted based upon pre-established weights associated with the historical scores. Finally, the weighted composite score can be computed for the Web site viewing session based upon both the weighted data and the weighted averaged historical scores.

A Web site quality measurement system further can be provided in accordance with the inventive arrangements. The system can include a log configured to record visitor data and session data for visitors to a Web site. A rank database further can be provided. More particularly, the rank database can specify scores for different values for the visitor data and the session data. A weight database yet further can be provided which can specify computational weights for different elements of the visitor data and the session data. Finally, quality measurement processor can be configured to compute a visit quality score for the Web site by ranking visitor and session data recorded in the log, weighting the ranked visitor and session data according to the specified computational weights, and aggregating the weighted ranked visitor and session data.

Importantly, in one aspect of the invention, the visitor data can include at least one element selected from the group consisting of a unique visitor identifier, a referring network entity identifier, and browser configuration data. By comparison, the session data can include at least one element selected from the group consisting of a Web site page reference and a time entry denoting a duration of time during which a visitor viewed a Web page corresponding to the Web site page reference. Finally, a history database can be configured to store historically computed visit quality scores for sessions previously established between individual ones of the visitors and the Web site.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a Web site visit quality measurement system and method in which individual visits to a Web site can be monitored and, based upon the visit, a quality measurement can be applied to the individual visit. Factors can be defined based upon which the quality measurement can be computed. Those factors can include, for instance, visitor identification data such as IP addressing, session data such as the pages viewed in the Web site and the time during which the visitor viewed the individual pages, historical data such as session data which had been previously recorded for the visitor during other visits, and content data such as a ranking of the different elements and pages of the Web site. Importantly, each of the different factors can be weighted so as to emphasize some factors while de-emphasizing others. In this way, a qualitative metric can be applied to a Web site which can be used to determine the effectiveness of the Web site, specifically, as a marketing tool.

Figure 1:
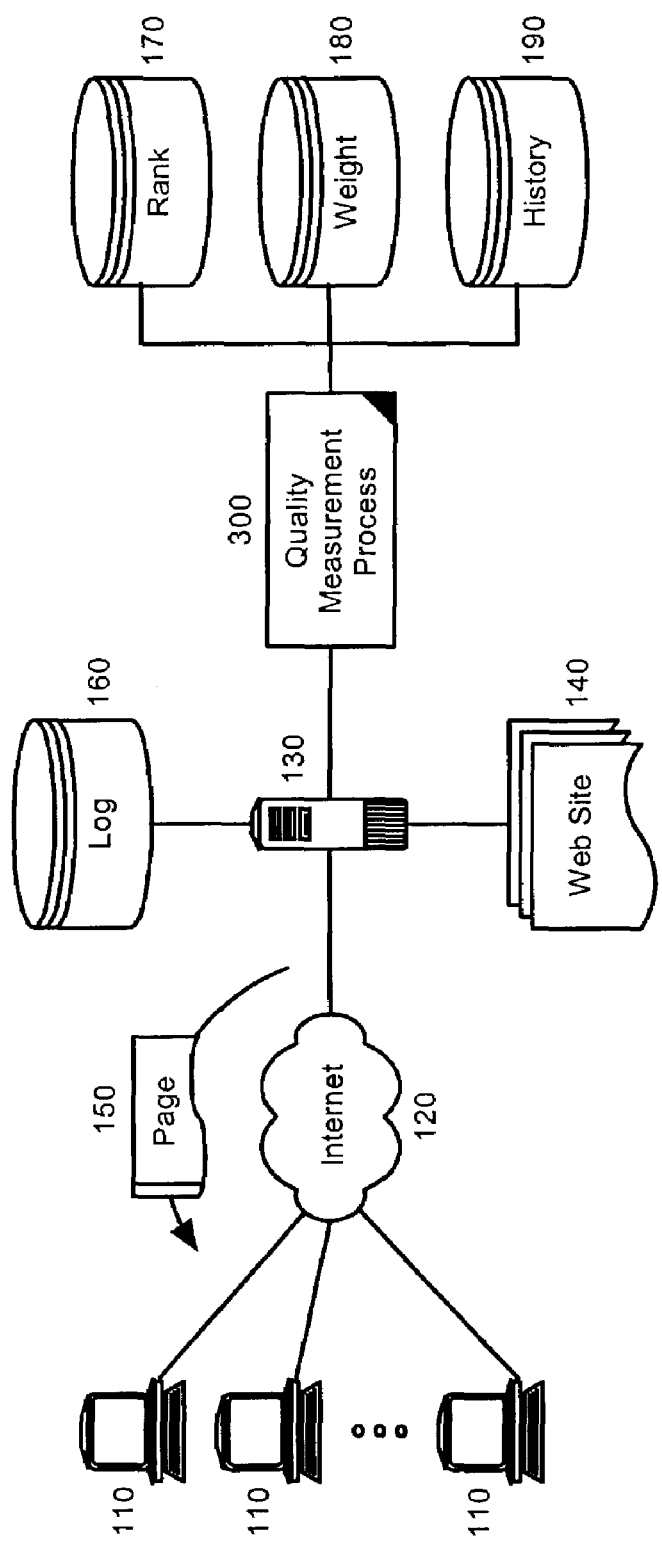
FIG. 1 is a schematic illustration of a Web site quality measurement system disposed within the World Wide Web.

FIG. 1 is a schematic illustration of a Web site quality measurement system disposed within a global document delivery system such as the World Wide Web. Specifically, the Web site quality measurement system can include a document server 130 such as a Web server, which has been configured to be communicatively coupled to one or more document browser clients 110 over a global computer communications network 120, for example the public Internet. The document server 130 can be linked to a store containing one or more hypermedia documents, multimedia elements and computer code, a selection of which can form a Web site 140. On demand, the document server 130 can serve pages 150 and respective elements of the Web site 140 to requesting document browser clients 110.

Notably, each time a particular one of the document browser clients 110 establishes a session with the document server 130 through which a Web site 140 can be viewed, metrics associated with both the particular one of the document browser clients 110 and the session itself can be recorded in a log 160. In respect to the metrics associated with the particular one of the document browser clients 110, the metrics can include, for example, the network identity of the particular one of the document browser clients 110, configuration data associated with the particular one of the document browser clients 110, and the identity of the network source which referred the particular one of the document browser clients 110 to the Web site 140. By comparison, in respect to the metrics associated with the session itself, the metrics can include the identity of the pages 150 served to the particular one of the document browser clients 110 and the duration of time in which the pages 150 where each viewed.

The Web site quality measurement system of the present invention also can include a data store of factor rankings 170, a data store of factor weights 180, and a data store of historical measurements 190. The data store of factor rankings 170 can include a ranking of the relative importance of each of the visitor data and the pages which visitors may view in the course of a viewing session. In essence, the pages of a Web site can be "graded" whereas some pages are considered to be more important than other pages. The data store of factor weights 180, by comparison, can include a list of weights as applied to each of visitor data, session data and historical data. Based upon these weightings, different accumulated data can have a different impact upon an overall quality measurement score. Finally, the data store of historical measurements 190 can include data associated with individual visitors who had previously viewed pages of the Web site 140. For instance, the historical measurements can include an average quality measurement score for all previous sessions and the amount of time spent upon certain pages in the Web site 140.

Importantly, the Web site quality measurement system of the present invention can include a Quality Measurement Process 300. The Quality Measurement Process 300 can statically analyze the log 160 to establish a quality score for any one particular visit by a viewer of the Web site 140 as recorded in the log 160. In particular, the Quality Measurement Process 300 can base the establishment of the quality score upon the data store of factor rankings 170, the data store of factor weights 180, and the data store of historical measurements 190. Notably, some factors can be weighted so as to produce some or no effect in the analysis. More particularly, the factors used to establish the quality score can be selectively chosen while others can be ignored. In any case, the established quality score and selected ones of intermediately computed data for the visit can be written to the data store of historical measurements 190.

In one aspect of the invention, not all factor rankings 170 need be predetermined. Rather, other factors can be ranked dynamically. For instance, factor rankings can be sourced through a subscription to factors such as a list of domain names or some other such factor. In this way, the tedium associated with manually establishing the factor rankings can be reduced through the importation of factor rankings produced by third parties.

Figure 2:
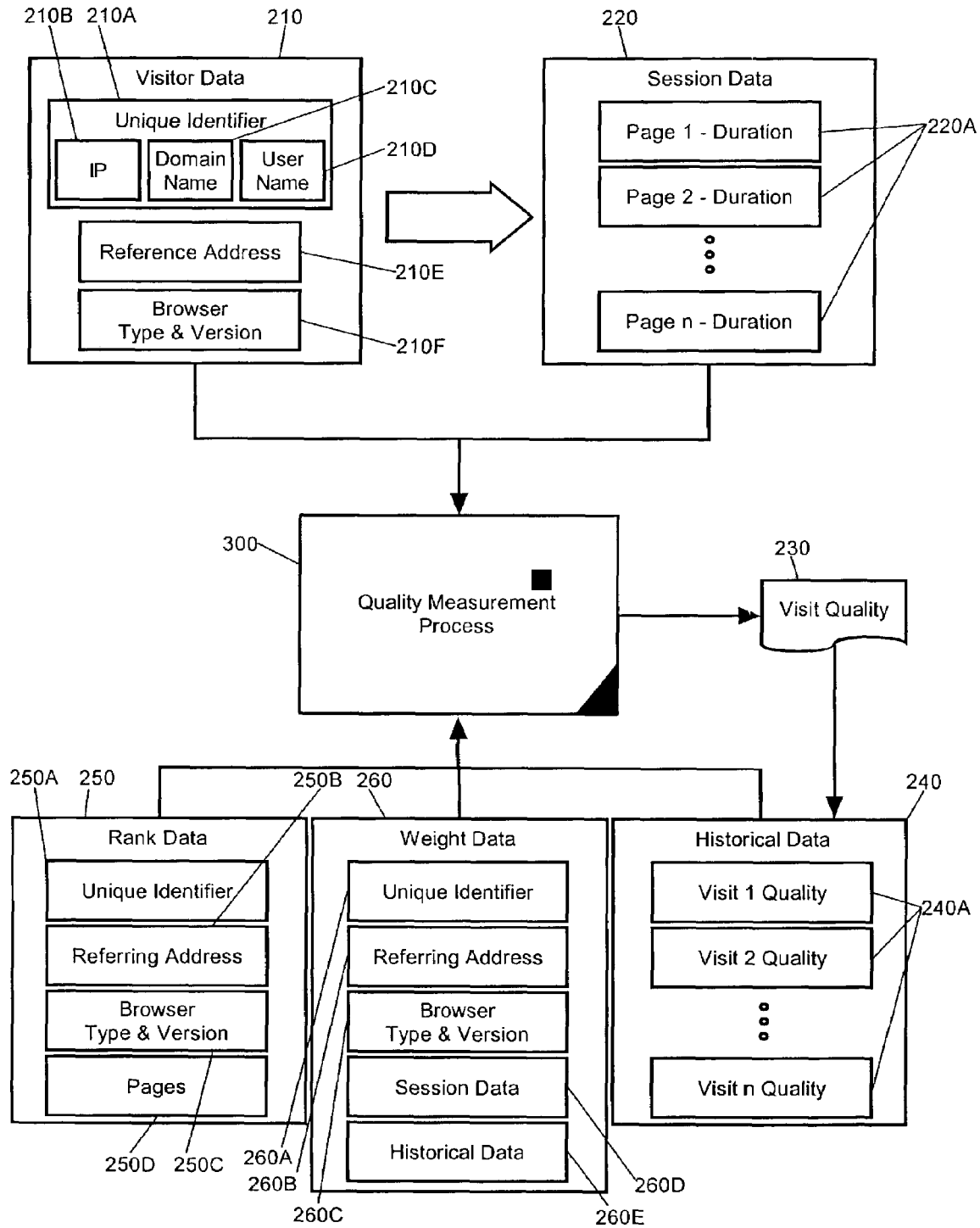
FIG. 2 is a block diagram illustrating the Web site quality measurement system of FIG. 1; and, FIG. 3 is a flow chart illustrating the Web site quality measurement process of the present invention.

FIG. 2 is a block diagram illustrating the Web site quality measurement system of FIG. 1. Specifically, as shown in FIG. 2, the Quality Measurement Process 300 can consider each of rank data 250, weight data 260 and historical data 240 when analyzing the quality of a visit to a Web site based upon both visitor data 210 and session data 220. More particularly, the Quality Measurement Process 300 can statically analyze a log of individual elements of visitor data 210 and session data 220. Each of these individual elements can be ranked based upon specified rank data 250, and weighted based upon the importance of the individual element relative to other elements as specified by the weight data. Finally, historical data 240 relating to the visitor can be considered in order to establish a relative trend of quality when considering past visits by the visitor. As a result, the Quality Measurement Process 300 can produce a visit quality score 230 which also can be written to the historical data 240 for subsequent reference.

Notably, the visitor data 210 can include logged elements which relate to the identity of the visitor viewing pages in the Web site. In that regard, the visitor data 210 can include a unique identifier 210A, such as an IP address 210B, a domain address 210C, and a user name 210D. The visitor data 210 also can include a reference to the network entity which referred the visitor to the Web site. In that regard, the reference to the network entity can include a reference address 210E, for instance a uniform resource locator (URL) associated with a referring Web site resource. Finally, the visitor data 210 can include configuration data relating to the mechanism through which the visitor can access the pages of the Web site. For example, the configuration data can include browser type and versioning data 210F.

Once the visitor has requested access to an initial page in the Web site, session data 220 can be logged for the viewing session between the visitor and the Web site. To that end, session data 220 can be logged which tracks the interaction between the visitor and the various pages of the Web site. Accordingly, the session data 220 can include references 220A to a set of visited pages in the Web site and the duration of time during which the visitor viewed each one of the pages in the Web site. In this way, it can be determined which pages in the Web site captured the attention of the visitor more effectively than others. When considering the content of any one page in the Web site, it further can be determined whether the duration aspect of the reference 220A for a particular page related more to the substance of the content, or the volume of the content.

The rank data 250 can rank each element of the visitor data 210 and the session data 220 so as to establish "scores" for each element. Thus, the rank data 250 can include rankings for the unique identifier 250A, referring address 250B, Browser Type and Version 250C, and the Pages and Duration 250D. By matching the logged metrics for the visitor data 210 and session data 220 to corresponding scores specified by the rank data 250, each logged element 260A, 260B, 260C, 260D can be numerically valued so that different visits can be compared equivalently. Still, recognizing that some logged metrics are of greater import than others, the elements of the visitor data and session data can be weighted according to weight data 260 assigned to each element of the visitor data 210 and session data, and also to historically recorded data 260E.

Finally, the Quality Measurement Process 300 can consider historically recorded data 240 in computing a visit quality score 230 for a single visit by a visitor to the Web site. In this regard, whenever a visit quality score 230 has been produced for a single visit, the score for the visit can be recorded as an entry 240A to the historical data 240. Subsequently, the entries 240A can be averaged to determine an average quality for the particular visitor for all of the visits. Based upon this average, anomalic quality scores computed for the visitor in subsequent visits can be smoothed as the historical data 260E can be considered during the weighting process. Moreover, visit characteristics can be better interpreted by inspecting the historical data 240, specifically in respect to the time taken to review the contents of any one page. More particularly, individual visitors read and comprehend content at different paces. From visitor to visitor, then, the duration of time spent reviewing a single page can be difficult to compare. Yet, where only a single visitor has visited the same site multiple times, a relative comparison can be performed.

Figure 3:
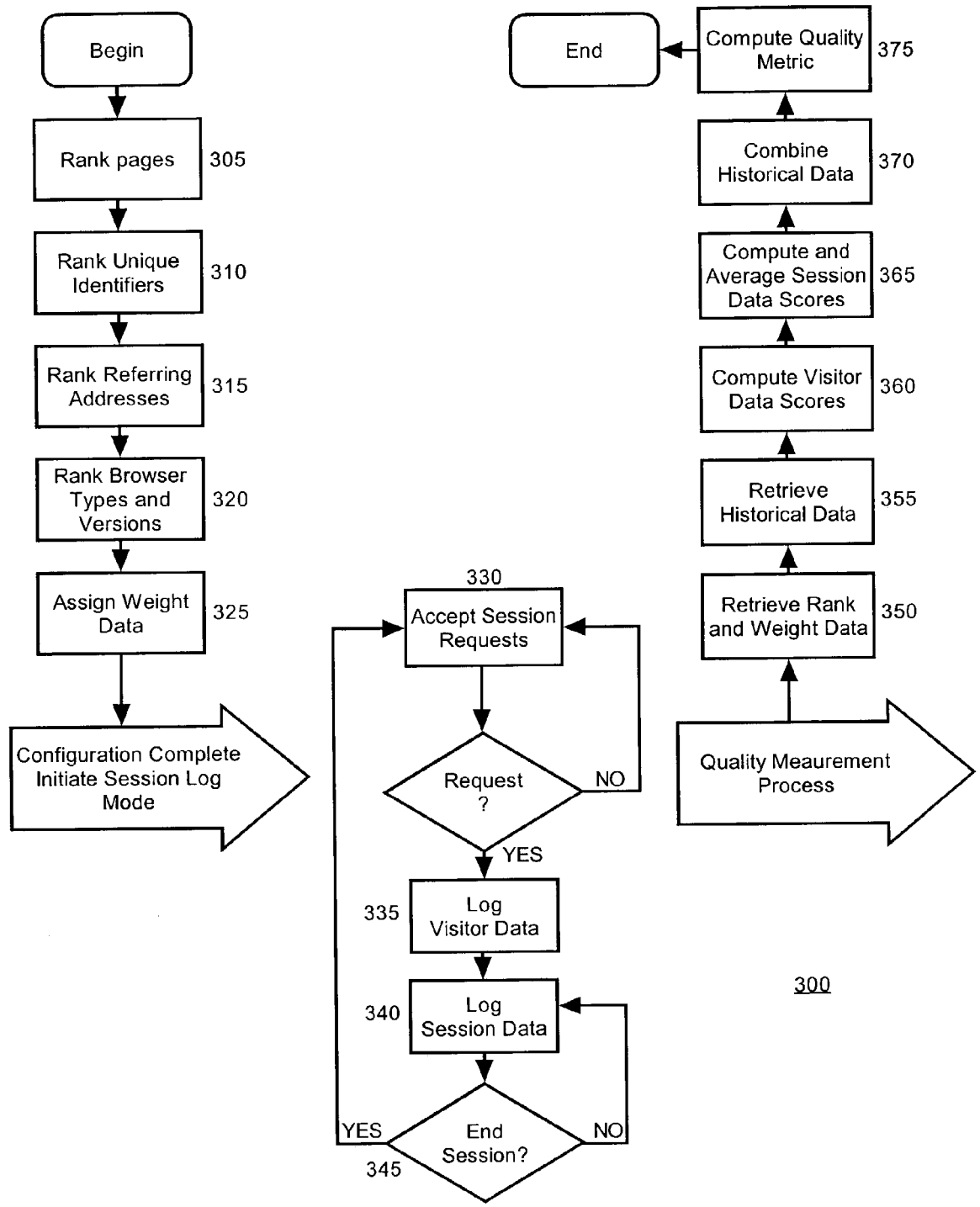

FIG. 3 is a flow chart illustrating the Web site quality measurement process of the present invention. Beginning in blocks 305 through 325, a configuration process can be performed, preferably by an operator, so as to prepare the Web site quality measurement system of the present invention for real-time operation. Specifically, in block 305, each page in the Web site can be assigned a rank or score. In block 310, each unique identifier further can be assigned a rank. In block 315, the referring address yet further can be assigned a rank. In block 320, the browser configuration data can be assigned a rank. Finally, in block 325, each of the categories of data can be weighted to assign a relative importance to each, e.g. pages are more important than referring addresses and should be weighted more heavily as a result.

Continuing in blocks 330 through 345, a real-time logging process is shown in which visitor data and session data can be logged for each established session between visitor and Web site. In particular, in block 330, the Web site as managed by a Web server can accept session requests from individual visitors. Session requests typically can include one or more requests for Web site resources as would typically be found in a uniform resource identifier (URI) within a URL. If no requests are received in decision block 335, the process can continue until such time as a session request is received. When a session request has been received, in block 340, the visitor data associated with the visitor can be logged. Similarly, in block 345 the session data can be logged. Notably, session data can be logged for each page viewed by the visitor. In that respect, the process can repeat through blocks 350 and 345 for each page viewed by the visitor until the session has concluded. When the session has concluded, the process of blocks 330 through 350 can repeat for subsequent sessions.

Importantly, it will be recognized by one skilled in the art that the process of recording session and visitor metrics to the log is not to be limited exclusively to a sequential process in which only one session can be handled at any one time. Rather, it is to be understood that the foregoing logging process can be undertaken for multiple concurrently active sessions for greater efficiency. In any case, once session data for a complete session has been recorded in the log, the Quality Measurement Process 300 of the present invention can compute a visit quality score for the particular session.

More particularly, in block 355, the previously established rank and weight data can be retrieved from storage. Similarly, in block 360 the historical data for the particular visitor under study can be retrieved from storage. In block 365, scores can be assigned to each element of the visitor data recorded in the log. Similarly, in block 370 scores can be assigned to each element of the session data recorded in the log. Based upon the number of pages viewed during the session as recorded in the log, in block 370 an average score also can be computed for the aggregate of pages viewed during the session. In block 375, the historical data for the visitor can be retrieved and averaged with the session data for the particular visit recorded in the log. Finally, in block 380, a visit quality score can be computed by applying the weights to each scored element and summing the weighted scores to produce a visit quality metric.

Significantly, the Web site quality measurement system illustrated and described herein can address several of the deficiencies of conventional log-file based Web site traffic measurement systems. As an example, in conventional log-file based Web site traffic measurement systems, visits to Web sites are measured in terms of identifying which pages were viewed by which users at which time. Using this conventional analysis one only can conclude which pages in a site are most popular for a given time period. Conventional systems, however, provide no manner in which the quality of a Web site visit can be determined. In the present invention, however, the unique ranking and weighting of visitor and session metrics provides a novel and non-obvious system and method through which Web site visit quality can be established.

The method and system of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A Web site quality measurement method, the method comprising the steps of:

logging visitor data and session data for a Web site viewing session established between a Web site visitor and a Web site comprising a plurality of Web site pages, wherein the logged visitor data comprises a plurality of visitor-specific metrics including a network identifier corresponding to a document browser client used by the Web site visitor, configuration data associated with the document browser client, a source identifier indicating a network source that referred the document browser client to the Web site, and wherein the logged session data comprises a plurality of session-specific metrics including at least one page identifier for identifying each page served to the document browser client and a time indicator of a duration of time that each page served is viewed by the Web site visitor;

dynamically ranking at least a portion of said logged visitor data and session data based upon ranking criteria loaded when the Web site viewing session is established, the ranking criteria being obtained through a subscription to factors associated with Web site visitor data, at least one of the factors being generated and loaded at the time the ranking is performed;

statistically analyzing the visitor data and session data to compute a composite score for said Web site viewing session based upon said individually ranked data, the composite score providing a quality measurement of the Web site;

generating a plurality of composite scores for a plurality of Web site viewing sessions and matching user-specific and session-specific metrics to equivalently compare a quality of each Web site viewing session based upon a comparison of the composite scores;

generating a plurality of composite scores computed at different times to establish a relative trend of quality associated with the Web site;

weighting said individually ranked logged data based upon pre-established weights associated with said visitor data and session data;

computing a weight composite score for said Web site viewing session based upon said weighted data;

adding said computed weighted composite score to a database of historical scores for said Web site visitor; and wherein said step of computing said weighted composite score further comprises the step of: averaging said historical scores for said Web site visitor; weighted said averaged historical scores based upon pre-established weights associated with said historical scores; and, computing said weighted composite score for said Web site viewing session based upon said weighted data and said weighted average historical scores.

2. The method of claim 1, wherein for each session established between a Web site visitor and a Web site said session data tracks interactions between the Web site visitor and each of the plurality of Web site pages of the Web site to determine a duration of time that the Web site visitor viewed each of the Web site pages, and further comprising determining whether the duration of time at each page is based upon substance of the page content or volume of the page content.

3. A Web site quality measurement system comprising:
a log configured to record visitor data and session data for visitors to a Web site, wherein the logged visitor data comprises a plurality of visitor-specific metrics including a network identifier corresponding to a document browser client used by the Web site visitor, configuration data associated with the document browser client, a source identifier indicating a network source that referred the document browser client to the Web site, and wherein the logged session data comprises a plurality of session-specific metrics including at least a page identifier for identifying each page served to the document browser client and a time indicator of a duration of time that each page served is viewed by the Web site visitor;
a rank database specifying scores for different values for said visitor data and said session data; and,
a quality measurement processor configured to rank visitor and session data recorded in said log and aggregate said ranked visitor and session data, wherein each ranking is based upon ranking criteria loaded by said processor when a Web site viewing session is established between a visitor and a Web site, and wherein said ranking criteria is obtained through a subscription to factors associated with said visitor data, at least one of the factors being generated and loaded at the time the ranking is performed,
statistically analyze the visitor data and session data to generate a composite score for said Web site viewing session based upon said individually ranked data, the composite scored providing a quality measurement of the Web site,
generate a plurality of composite scores for a plurality of Web site viewing sessions and matching user-specific and session-specific metrics to equivalently compare a quality of each Web site viewing session based upon a comparison of the composite scores,
generate a plurality of composite scores computed at different times to establish a relative trend of quality associated with the Web site,
weighting said individually ranked logged data based upon pre-established weights associated with said visitor data and session data,
computing a weight composite score for said Web site viewing session based upon said weighted data,
adding said computed weighted composite score to a database of historical scores for said Web site visitor, and
wherein said step of computing said weighted composite score further comprises the step of: averaging said historical scores for said Web site visitor; weighted said averaged historical scores based upon pre-established weights associated with said historical scores; and, computing said weighted composite score for said Web site viewing session based upon said weighted data and said weighted average historical scores.

4. The Web site quality measurement system of claim 3, wherein visitor data comprises at least one element selected from the group consisting of a unique visitor identifier, a referring network entity identifier, and browser configuration data, and wherein said subscribed factors include at least one of a domain name associated with the visitor and a uniform resource locator corresponding to the visitor.

5. The Web site quality measurement system of claim 3, wherein said session data comprises at least one element selected from the group consisting of a Web site page reference and a time entry denoting a duration of time during which a visitor viewed a Web page corresponding to said Web site page reference.

6. The Web site quality measurement system of claim 3, further comprising:
a history database configured to store historically computed visit quality scores for sessions previously established between individual ones of said visitors and said Web site.

7. A machine readable storage having stored thereon a computer program for measuring Web site visit quality, the computer program comprising a routine set of instructions which when executed by the machine can cause the machine to perform the steps of:
logging visitor data and session data for a Web site viewing session established between a Web site visitor and a Web site comprising a plurality of Web site pages, wherein the logged visitor data comprises a plurality of visitor-specific metrics including a network identifier corresponding to a document browser client used by the Web site visitor, configuration data associated with the document browser client, a source identifier indicating a network source that referred the document browser client to the Web site, and wherein the logged session data comprises a plurality of session-specific metrics including at least an identifier of each page served to the document browser client and a time indicator of a duration of time that each page served is viewed by the Web site visitor;
dynamically ranking at least a portion of said logged visitor data and session data based upon ranking criteria loaded when the Web site viewing session is established, the ranking criteria being obtained through a subscription to factors associated with Web site visitor data, at least one of the factors being generated and loaded at the time the ranking is performed;
statistically analyzing the visitor data and session data to compute a composite score for said Web site viewing session based upon said individually ranked data, the composite score providing a quality measurement of the Web site;
generating a plurality of composite scores for a plurality of Web site viewing sessions and matching user-specific and session-specific metrics to equivalently compare a quality of each Web site viewing session based upon a comparison of the composite scores;
generating a plurality of composite scores computed at different times to establish a relative trend of quality associated with the Web site;
weighting said individually ranked logged data based upon pre-established weights associated with said visitor data and session data;
computing a weight composite score for said Web site viewing session based upon said weighted data;
adding said computed weighted composite score to a database of historical scores for said Web site visitor; and
wherein said step of computing said weighted composite score further comprises the step of: averaging said historical scores for said Web site visitor; weighted said averaged historical scores based upon pre-established weights associated with said historical scores; and, computing said weighted composite score for said Web site viewing session based upon said weighted data and said weighted average historical scores.

* * * * *